(12) United States Patent
Foster et al.

(10) Patent No.: US 8,280,382 B2
(45) Date of Patent: Oct. 2, 2012

(54) CELLULAR COMMUNICATION SYSTEM AND METHOD OF OPERATION THEREFOR

(75) Inventors: Gerard T. Foster, Marston Meysey (GB); Trevor T. Hanna, Dowdeswell (GB); Subramanian S. Iyer, Vernon Hills, IL (US); Luis Lopes, Swindon (GB); Howard J. Thomas, Cirencester (GB)

(73) Assignee: Motorola Mobility LLC, Libertyville, IL (US)

( * ) Notice: Subject to any disclaimer, the term of this patent is extended or adjusted under 35 U.S.C. 154(b) by 607 days.

(21) Appl. No.: 12/530,785

(22) PCT Filed: Apr. 10, 2008

(86) PCT No.: PCT/US2008/059868
§ 371 (c)(1),
(2), (4) Date: Sep. 11, 2009

(87) PCT Pub. No.: WO2008/134219
PCT Pub. Date: Nov. 6, 2008

(65) Prior Publication Data
US 2010/0120437 A1    May 13, 2010

(30) Foreign Application Priority Data

Apr. 25, 2007 (GB) .................................. 0708004.7

(51) Int. Cl.
*H04W 36/00* (2009.01)
(52) U.S. Cl. ........ 455/444; 455/436; 455/437; 455/438; 455/439; 455/440; 455/441; 455/442; 455/443; 455/447; 455/448; 455/449; 370/328; 370/329; 370/330; 370/331; 370/332

(58) Field of Classification Search .............. 455/436, 455/437, 438, 439, 440, 441, 442, 443, 444, 455/447, 448, 449; 370/328, 329, 330, 331, 370/332, 333, 338
See application file for complete search history.

(56) References Cited

U.S. PATENT DOCUMENTS

| | | | | |
|---|---|---|---|---|
| 5,557,657 A * | 9/1996 | Barnett | ......................... | 455/444 |
| 6,091,955 A * | 7/2000 | Aalto et al. | ................... | 455/447 |
| 6,377,608 B1 * | 4/2002 | Zyren | ........................... | 375/132 |
| 6,400,952 B2 * | 6/2002 | Kim et al. | ..................... | 455/436 |
| 6,430,168 B1 | 8/2002 | Djurkovic et al. | | |
| 6,628,630 B1 * | 9/2003 | Nagase | ......................... | 370/331 |
| 7,039,410 B2 * | 5/2006 | Jovanovic | .................... | 455/444 |
| 7,389,112 B2 * | 6/2008 | Nilsson et al. | ................ | 455/444 |
| 2005/0037798 A1 | 2/2005 | Yamashita et al. | | |

(Continued)

FOREIGN PATENT DOCUMENTS

| | | |
|---|---|---|
| EP | 1471763 B1 | 7/2007 |
| WO | 0111804 A1 | 2/2001 |
| WO | 2007029881 A2 | 3/2007 |

*Primary Examiner* — Olumide T Ajibade Akonai

(57) ABSTRACT

A cellular communication system comprises an access point (101) which supports an underlay cell of a first cell on an underlay frequency using another frequency. A proximity detector (113) detects user equipment (109) in response to a wireless transmission therefrom, which uses a different transmission technology from a transmission of the cellular communication system. In response to the proximity detection, the access point (101) temporarily transmits a pilot signal on the first cell frequency. The user equipment (109) is then switched to the access point (109) and the underlay frequency in response to a detection indication from the user equipment (109) indicating that the pilot signal has been detected. Following the switch the access point (101) terminates the transmission of the pilot signal.

10 Claims, 2 Drawing Sheets

U.S. PATENT DOCUMENTS

2006/0252428 A1* 11/2006 Agashe et al. ............... 455/436
2007/0008929 A1* 1/2007 Lee et al. ..................... 370/331
2007/0213067 A1* 9/2007 Li et al. ........................ 455/444

* cited by examiner

CELLULAR COMMUNICATION SYSTEM AND METHOD OF OPERATION THEREFOR

FIELD OF THE INVENTION

The invention relates to a cellular communication system and in particular, but not exclusively, to handover and cell selection in a Code Division Multiple Access (CDMA) communication system.

BACKGROUND OF THE INVENTION

A method which has been used to increase the capacity of cellular communication systems is the concept of hierarchical cells wherein a macro-cell layer is underlayed by a layer of typically smaller cells having coverage areas within the coverage area of the macro-cell. In this way, smaller cells, known as micro-cells or pico-cells (or even femto-cells), are located within larger macro-cells. The micro-cells and pico-cells have much smaller coverage thereby allowing a much closer reuse of resources. Frequently, the macro-cells are used to provide coverage over a large area, and micro-cells and pico-cells are used to provide additional capacity in e.g. densely populated areas and hotspots. Furthermore, pico-cells can also be used to provide coverage in specific locations such as within a residential home or office.

In order to efficiently exploit the additional resource, it is important that handover/cell selection performance between the macro-cell layer and the underlying layer is optimized.

The current trend is towards introducing a large number of pico-cells to 3G systems. For example, it is envisaged that residential access points may be deployed having only a target coverage area of a single residential dwelling or house. The use of residential cells may not only provide increased capacity but may also facilitate service and subscription differentiation. For example, a subscriber may pay a substantially lower cost when at home using his dedicated residential access point than when using the cellular communication system remotely. A widespread introduction of residential access points would result in a very large number of small underlay cells within a single macro-cell.

However, underlaying a macrolayer of a 3G network with a pico-cell (or micro-cell) layer creates several issues that must be addressed. In particular, it makes efficient handover/cell selection techniques even more critical. In particular, it is desirable that handover/cell selection is efficient and simple and preferably allows seamless mobility for the mobile station between the layers. Furthermore, it is desired that the interference from the underlay layer to the macrolayer is minimized.

However, such requirements are not always easily met and may in many cases be in conflict with each other. For example, soft handover techniques are used in many CDMA systems to provide efficient handover with reduced interference. However, soft handover requires time synchronization of base stations and as the backhaul from e.g. residential access points typically cannot be guaranteed to be sufficiently time synchronized to support recombination, it is impractical to support soft handover for a residential access point underlay layer.

However, operating an underlay without soft handover tends to result in increased interference between the layers and specifically results in issues with managing the near far effects. In order to avoid this interlayer interference, it is advantageous to operate the macro-layer and the underlay layer on different CDMA frequencies thereby providing a high degree of separation between the layers.

However, using different frequencies for the different layers impacts the handover/cell selection operation of the systems. Specifically, for capacity and/or billing reasons, it is desirable that the underlay cell is used whenever possible even if a high quality of service could be provided by the macro layer. However, in systems such as UMTS, the handover algorithm is biased towards minimizing the number of handovers that are performed and the algorithm will tend not to handover a mobile station to a different frequency unless it is currently experiencing poor quality of service. Specifically, if a mobile station is receiving good coverage, the handover algorithm can choose to ignore a secondary frequency completely. Indeed, for CDMA same frequency measurements are substantially simpler to perform than measurements of other frequencies than the current serving frequency. Therefore, in many scenarios, mobile stations will not perform other frequency measurements unless the current conditions are poor. Therefore, a residential access point using a different frequency will not be detected by mobile stations in a good macro-cell coverage area thereby resulting in the mobile station remaining on the macro-cell rather than switching to the underlay cell.

Hence, an improved cellular communication system would be advantageous and in particular a system allowing improved handover/cell selection between macro-cells and underlay cells using different frequencies; reduced interlayer interference; improved mobility support; increased handover to underlay cells; facilitated operation; efficient implementation and/or improved performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a cellular communication system comprising: an access point for supporting an underlay cell of a first cell, the first cell being supported by a first frequency and the underlay cell being supported by the access point on a second frequency: proximity detection means for performing a proximity detection for a user equipment in response to a wireless transmission from the user equipment, the wireless transmission not being a wireless transmission of the cellular communication system; transmitting means for temporarily transmitting a pilot signal from the access point on the first frequency in response to the proximity detection; switching means for switching the user equipment from the first frequency of the first cell to the second frequency of the underlay cell in response to receiving a detection indication from the user equipment, the detection indication being an indication that the pilot signal has been detected by the user equipment; and means for terminating the transmission of the pilot signal on the first frequency following the switching of the user equipment to the second frequency.

The invention may allow improved performance in a cellular communication system. In particular, the invention may allow underlay and overlay cells to use different frequencies while allowing handovers/cell reselections from the higher layer to the lower layer to be based on same frequency measurements. The interference to the higher layer from the underlay layer may be reduced and may in particularly be limited to short time intervals e.g. associated with a user entering the underlay cell.

The switching of the user equipment may be a handover, a cell (re)selection or any other switching of the user equipment from being supported by the first frequency in the first cell to being supported by the second frequency in the second cell. The frequencies may support the user equipment by supporting an active call and/or by supporting it in idle mode where no active call is ongoing.

According to another aspect of the invention there is provided an access point for a cellular communication system, the access point supporting an underlay cell of a first cell, the first cell being supported by a first frequency and the underlay cell being supported by the access point on a second frequency and the access point comprising: proximity detection means for performing a proximity detection for a user equipment in response to a wireless transmission from the user equipment, the wireless transmission not being a wireless transmission of the cellular communication system; transmitting means for temporarily transmitting a pilot signal from the access point on the first frequency in response to the proximity detection; switching means for switching the user equipment from the first frequency to the second frequency in response to receiving a detection indication from the user equipment, the detection indication being an indication that the pilot signal has been detected by the user equipment; and means for terminating the transmission of the pilot signal on the first frequency following the switching of the user equipment to the second.

According to another aspect of the invention there is provided a method of operation for a cellular communication system comprising a first access point for supporting an underlay cell of a first cell, the first cell being supported by a first frequency and the underlay cell being supported by the access point on a second frequency, the method comprising: performing a proximity detection for a user equipment in response to a wireless transmission from the user equipment, the wireless transmission not being a wireless transmission of the cellular communication system; temporarily transmitting a pilot signal from the access point on the first frequency in response to the proximity detection; switching the user equipment from the first frequency to the second frequency in response to receiving a detection indication from the user equipment, the detection indication being an indication that the pilot signal has been detected by the user equipment; and terminating the transmission of the pilot signal on the first frequency following the switching of the user equipment to the second frequency.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a CDMA cellular communication system and in particular to a $3^{rd}$ Generation Cellular communication system such as a UMTS System. However, it will be appreciated that the invention is not limited to this application but may be applied to many other communication systems.

Figure 1:
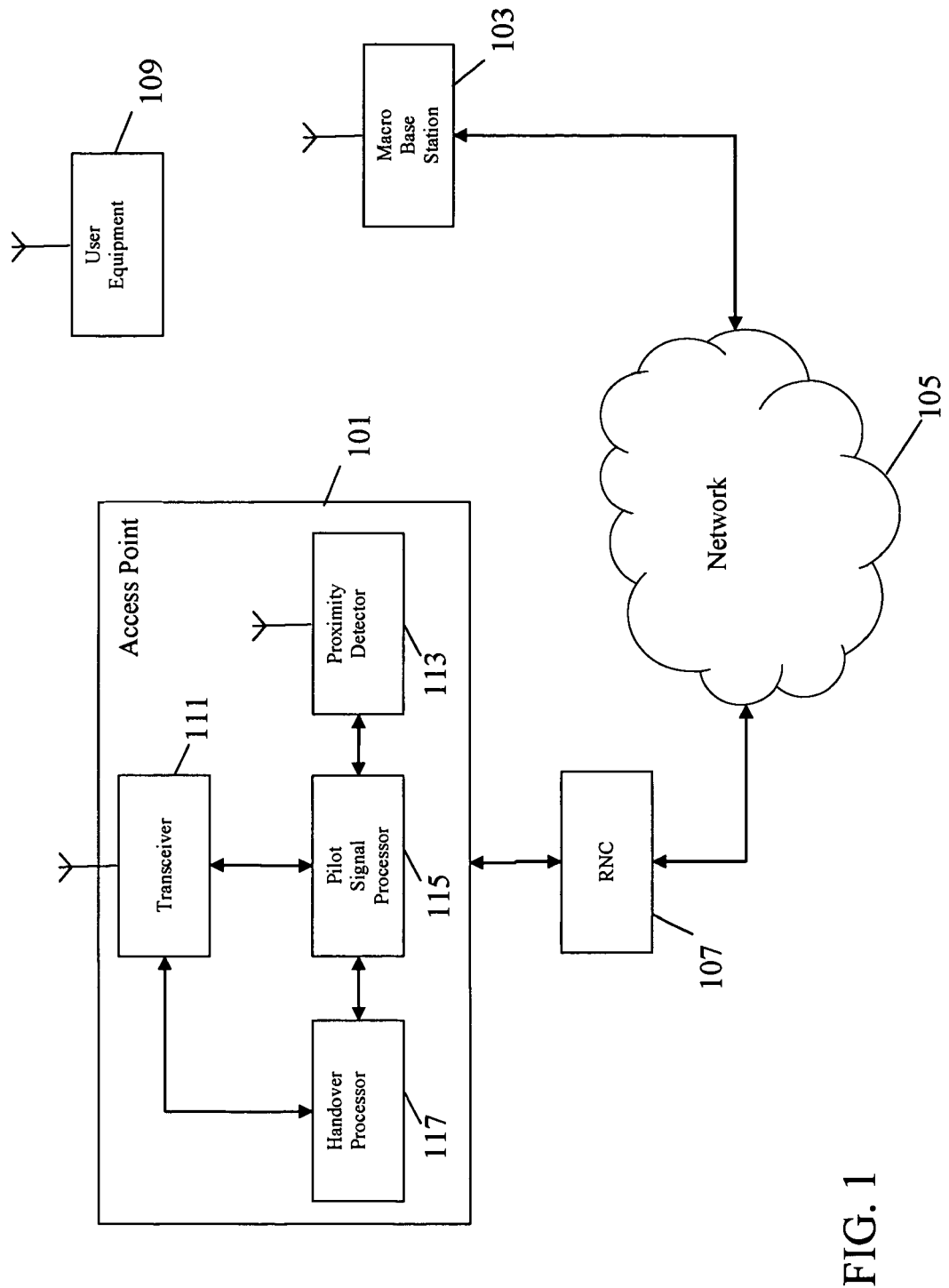
FIG. 1 illustrates an example of a cellular communication system in accordance with some embodiments of the invention.

FIG. 1 illustrates an example of a cellular communication system in accordance with some embodiments of the invention. In the system, a macro-layer is formed by macro-cells supported by base stations. Furthermore, an underlay layer of pico-cells are supported by a large number of access points corresponding to pico-cell base stations. For brevity and clarity, FIG. 1 illustrates only a single access point 101 and a single macro-cell base station 103. Specifically, each access point may have an intended coverage of a single house or dwelling, and for a typical macro-cell coverage area of 1 to 30 $km^2$ there may be hundreds or even thousands of pico-cells each supported by an individual access point.

FIG. 1 illustrates the macro-base station 103 coupled to a fixed network 105 which comprises an RNC (not shown) supporting the base station 103 as well as other functionality typical for a UMTS cellular communication network such as RNCs, MSCs, SGSNs, GGSNs, HLRs etc. as will be known to the person skilled in the art.

The fixed network 105 is coupled to a pico-RNC 107. The pico-RNC 107 is coupled to a plurality of access points with each pico-cell having a coverage range of typically ten to fifty meters. In the system each pico-cell is known as a residential cell as it is intended to serve a specific residential dwelling. Each of the access points may be considered as a personal access point for the residents of the dwelling and is intended to support these users when in their home location. Thus, each of the access points has an associated group of user equipments which are allowed to be supported by the access point (typically at a very low cost to the user). However, in the example, the individual access point does not support user equipments that are not registered with it even if the user equipment is located within the coverage of the residential cell. Thus, the individual access point only supports users in their home location and does not support users visiting the residential cell.

The user equipments may typically be remote stations, subscriber units, mobile stations, communication terminals, personal digital assistants, laptop computers, embedded communication processors or any communication element capable of communicating with a base station over the air interface.

The pico-RNC 107 is coupled to the first access point 101 which supports the residential underlay cell of the macro-cell. The access point 101 implements the required functionality of a UMTS base station in order to support UMTS communications within the pico-cell.

In the example, a user equipment 109 is located within the macro-cell of the macro base station 101 and is currently supported by the macro base station 101. If the user equipment 109 moves into the area served by the access point 101 it is desirable that the user equipment 109 is switched to the access point 101 and it is desirable that this switch is performed regardless of the quality of the current communication quality.

In the system of FIG. 1, the access point 101 is arranged to support the user equipment 109 using a different frequency than the macro-cell frequency. Thus, when an active or idle mode user equipment is served by the access point 101 it is supported using a different frequency than when served by the macro-cell. This allows the interference between the different layers to be significantly reduced and facilitates operation and results in increased quality of service.

At the same time, the access point 101 allows for handovers to the underlay cell to be based only on measurements performed at the macro-cell frequency. Specifically, the access point 101 is arranged to sometimes temporarily transmit a pilot signal on the macro-cell frequency. The user equipment 109 will detect this pilot signal and report it to the network 105 resulting in a handover/cell reselection of the user equipment 109 to the access point 101. The handover may be a direct handover to the underlay frequency or may be a handover to the macro-cell frequency temporarily supported by the access point 101 followed by a handover to the underlay frequency.

The handover can thus be achieved without requiring a measurement of a different frequency than the macro frequency thereby making the handover well defined and repeatable. Specifically, the use of the same frequency pilot signal results in handovers being performed if the access point pilot signal is stronger than the macro-cell even if the macro-cell is currently providing an adequate communication quality. Thus, the approach provides a same frequency lead-in to the residential underlay cell and underlay frequency.

Furthermore, the macro-cell pilot signal is gated such that it is only transmitted temporarily thereby resulting in the interference to the macro-cell being substantially reduced and in many embodiments the average interference may be negligible. The gating of the pilot signal is performed in response to a proximity detection of user equipments. Thus, only when a user equipment is sufficiently close to the residential underlay cell is the pilot signal transmitted thereby ensuring that the interference to the macro-cell is limited to times when the pilot signal is required for the lead-in. Furthermore, the proximity detection may in some embodiments include an identity determination for the user equipment 109 and the pilot signal may only be transmitted if this identity belongs to a user equipment which is allowed to use the access point, such as e.g. only user equipments of residents for the residential underlay cell.

The access point 101 comprises a transceiver 111 which is capable of receiving and transmitting air interface signals in accordance with the UMTS technical specifications. Specifically, the transceiver 111 transmits a pilot signal on the underlay frequency to support idle mode user equipment and it can furthermore communicate control data and user data to user equipments using the underlay frequency and in accordance with the Technical Specifications of UMTS.

The access point 101 furthermore comprises a proximity detector 113 which is arranged to perform proximity detections for the user equipment(s) registered with the access point 101. The proximity detector 113 specifically comprises a detection receiver which continuously monitors for specific wireless transmissions from user equipments. The wireless transmission which the proximity receiver monitors for is not a wireless transmission of the cellular communication system but is rather a transmission using a different technology. In the example, the wireless proximity transmission is thus not a transmission in accordance with the UMTS Technical Specifications but uses a different transmission technology/standard.

It will be appreciated that any suitable wireless transmission may be used for the proximity detection including for example an optical transmission. In the system of FIG. 1, a wireless radio transmission from a short range communication system is used such that the range of the wireless proximity transmission is less than the coverage range of the macro-cell. Typically, the range of the wireless communication system is of the same order as the coverage range of the underlay cell (e.g. with a range of less than, say, fifty meters) but in some embodiments an even shorter range transmission may be used such as e.g. a transmission having a less than ten meter range.

Thus, in the system the user equipment 109 also comprises means for transmitting non-UMTS radio signals and in the specific example, the wireless transmission is an RFID transmission from an RFID tag of the user equipment and the access point 101 comprises or is coupled to a Radio Frequency IDentification (RFID) receiver.

Hence, in the specific example, the user equipment 109 may have attached a simple RFID tag such as e.g. a stick-on RFID tag. The access point 101 comprises or is coupled to a remote located battery powered RFID Perimeter Device (RPD) which detects if the RFID tag of the user equipment 109 is sufficiently close to the RPD. Such RFIDs typically have a range of only around one meter and accordingly the RPD is located close to an entry point to the residential area served by the access point 101. For example, for an access point serving a house or flat, the RPD can be located by the front door. It will be appreciated that in many systems a plurality of proximity detection points may be used and that the proximity detector 113 may for example comprise or be coupled to a plurality of remotely located detectors such as an RPD at each door to the residence.

The remote detectors may be coupled to the main part of the access point 101 by a wired or wireless connection. For example, a Bluetooth™ or similar short range communication technology may be used.

When the user equipment 109 enters the residence served by the access point 101, the RFID tag is detected by the RPD which transmits a message to the centrally located part of the proximity detector 113. The proximity detector 113 is coupled to a pilot signal processor 115 which is arranged to control the transmission of a pilot signal on the macro-cell frequency. Specifically, the pilot signal processor 115 is coupled to the transceiver 111 and controls this to temporarily transmit the pilot signal from the access point 101 on the macro-cell frequency when the proximity detection is received. Thus, when the RPD detects the presence of the RFID tag it informs the proximity detector 113 which triggers the pilot signal processor 115 to generate and transmit a lead-in pilot signal on the macro-cell frequency using the transceiver 111.

When the pilot signal is transmitted, the user equipment 109 detects the presence of a strong pilot signal associated with the underlay cell. For example, the pilot signal comprises a CPICH (Common Pilot Channel) associated with the access point 101 and included in the neighbour list transmitted to the user equipment 109 from the macro base station 103. The user equipment 109 then detects the CPICH and transmits the measurement reports to the macro base station 103 which forwards it to the macro RNC serving the macro base station. This measurement is performed without requiring the user equipment 109 to make any measurements on any other frequency than the macro-cell frequency thus providing a simplified operation (and specifically avoiding the need to use compressed mode or have parallel receiver chains in the user equipment).

The macro RNC compares the measurements of the CPICH of the underlay cell to the CPICH of the serving cell and accordingly proceeds to initiate a handover of the user equipment 109 from the macro-cell to the underlay cell. In UMTS this handover will tend to be initiated even if the current communication quality is sufficient as the bias towards same frequency handovers is typically much less than between different frequency handovers.

The handover is in the access point 101 supported by a handover processor 117 which supports any handover (or cell reselection) to or from the access point 101.

As part of the handover process the macro RNC transmits a handover message to the user equipment 109 instructing it to handover to the access point 101. In some embodiments, the handover message may always contain an instruction to hand directly over to the underlay frequency. Thus, in such embodiments a blind, unconditional handover directly to the underlay frequency may be performed by the user equipment 109.

In other scenarios, the handover message comprises an instruction for the user equipment 109 to perform a same frequency handover to the access point 101. Thus, the user equipment 109 first hands over from the macro-cell frequency supported by the macro base station 103 to a channel of the macro-cell frequency which is supported by the access point 101. Thus, the access point 101 is arranged to temporarily support the communication on the macro-cell frequency. Once the user equipment 109 has been handed over to the access point 101, the handover processor 117 is informed and initiates an immediate handover of the user equipment 109 from the macro-cell frequency to a channel supported by the access point 101 on the underlay frequency. The inter frequency handover by the access point 101 is typically controlled by the RNC 107 in communication with the handover processor 117 but may in some embodiments be fully controlled by the handover processor 117 which may inform the RNC 107 of the handover after this has been successfully completed.

It will be appreciated that in some embodiments the handover from the macro-cell to the underlay cell may be unconditional and may be performed whenever the user equipment 109 detects the pilot signal. Thus, whenever it is possible for the user equipment to switch to the underlay frequency, it will be directed to do so. Also, for a two stage handover via the macro-cell frequency supported by the access point 101, the intracell interfrequency handover from the macro frequency to the underlay frequency may be unconditional.

Typically, the amount of time the user equipment 109 is supported by the access point 101 on the macro frequency is very short. In some embodiments only signaling data may be supported on the macro-cell frequency during this transition. For example, the access point 101 may setup a signaling channel for the user equipment 109 on the macro-cell frequency but may not set up any user data/traffic channels. When the user equipment 109 is handed over to the access point 101 an inter-frequency handover to the underlay frequency is immediately performed. The user data/traffic channels are then setup on the underlay frequency and the user equipment 109 proceeds to use these. Such an approach may result in a small gap in the user data communication but may also facilitate operation.

For an idle mode user equipment 109, a cell reselection process from the macro-cell to the underlay cell may follow a similar approach. Specifically, the user equipment 109 may monitor the CPICH of the access point 101 and will detect the temporary pilot signal if the user equipment 109 is sufficiently close to the underlay cell to result in a proximity detection. In response, the user equipment 109 transmits a cell reselection request to the access point 101 which forwards it to the pico-RNC 107 which in response initiates a cell reselection process. This process will result in the handover processor 117 being instructed to transmit a cell reselection message to the user equipment 109 and in response the user equipment 109 will execute the cell reselection process. Specifically, the cell reselection message may comprise an indication that the user equipment 109 should switch to the underlay frequency and access the access point 101. The user equipment 109 then transmits an attach message to the access point 109 on the underlay frequency. This attach message is detected by the handover processor 117 which informs the pico RNC 107 which then proceeds to finalize the cell reselection.

It will be appreciated that in some embodiments the cell reselection may also be a two-stage process wherein the user equipment 109 first attaches to the macro-cell frequency supported by the access point 101 followed by a second switch from the macro-cell frequency to the underlay frequency.

When the handover processor 117 detects that the handover/cell reselection has completed and the user equipment 109 is currently supported by the access point 101 on the underlay frequency it proceeds to inform the pilot signal processor 115 that the pilot signal no longer needs to be transmitted. Accordingly, the pilot signal processor 115 terminates the transmission of the pilot signal on the macro-cell frequency.

Thus, the system is arranged to switch (e.g. by cell reselection of an idle mode user equipment or a handover of an active communication) the user equipment from the macro frequency and macro-cell to the underlay frequency of the underlay cell in response to receiving a detection indication from the user equipment indicating that the pilot signal has been detected (e.g. by the neighbour measurement reports). Thus, the system provides a single frequency lead-in to the residential underlay cell while ensuring that any interference to the macro-cell is limited to short time intervals when a user equipment 109 enters the residential cell.

It will be appreciated that in some embodiments, the network may explicitly instruct the user equipment 109 to monitor for the pilot signal from the access point and to transmit a measurement report message (only) if the signal has been detected whereas in other embodiments the user equipment 109 may periodically transmit measurement reports for the pilot signal. Thus, effectively, the detection of the pilot signal may be performed by the user equipment 109 and/or the network.

In the specific embodiment, the proximity detector 113 is also arranged to determine an identity of the user equipment 109 from the received proximity signal. For example, the RFID signal will inherently comprise an identification indication for the RFID tag and thus for the user equipment 109. The proximity detector 113 furthermore has stored the identifications of all user equipments which are registered with the access point 101. Thus, the proximity detector 113 is aware of the identity of all the user equipments which are allowed to use the access point 101. The information may for example be received from a central subscription server operated by the network operator. Thus, when a user equipment subscribes to the service supported by the access point 101, the network operator can manually enter the identification data for the user equipment in the central subscription server (which may e.g. be the Home Location Register for the user equipment). It is then downloaded from the central subscription server to the proximity detector 113.

In the example, the proximity detector 113 compares the identity information from the proximity transmission from the user equipment 109 to the registered user equipments. If the wireless transmission is from a user equipment 109 which matches the identity of a registered user equipment, the proximity detector 113 proceeds to provide an indication to the pilot signal processor 115 that a temporary pilot signal should be transmitted as previously described. If the proximity signal is not from a user equipment registered with the access point 101, the proximity detector 113 simply ignores the proximity detection such that no pilot signal is transmitted if the identity indication of the signal does not correspond to one of the registered users. This may further reduce interference to the macro-cell and may specifically result in the pilot signal only being transmitted when it is necessary for a single frequency lead-in of a user equipment registered with the access point 101.

In the specific example where RFID proximity detection is used, RFID receivers may be located at the entry points to the region served by the access point 101. For example, if the underlay cell serves a house or apartment, an RFID receiver may be located at all doors to the house or apartment.

The proximity detector 113 may detect the presence of a user equipment 109 and may then determine whether this user equipment 109 is currently supported by the access point 101. If not, the user equipment 109 must be entering the underlay cell and accordingly the proximity detector 113 proceeds to generate an entry proximity detection resulting in the pilot signal being temporarily transmitted as previously described.

Similarly, an RFID receiver may be located at all exit points from the region served by the underlay cell. It will be appreciated that in many embodiments the entry and exit points of the region may coincide and that a single RFID receiver may detect both user equipments entering the region as well as user equipments exiting the region. In other embodiments, separate RFID receivers may alternatively or additionally be used for potentially separate entry and exit points.

In the example, the proximity detector 113 may not only be arranged to detect that the user equipment 109 enters a region but may also detect when the user equipment 109 exits the region. Specifically, the proximity detector 113 may detect the presence of a user equipment 109 at one of the RFID receivers and may in response determine whether this user equipment 109 is currently supported by the access point 101. If so, the user equipment 109 must be exiting the underlay cell. In response to the detection of the user equipment exiting the underlay cell, the access point can initiate a handover by transmitting a handover request to the pico RNC 107. The handover request can specifically request a handover to the macro-cell thereby resulting in an automatic and immediate handover from the underlay frequency to the macro-cell frequency.

It will be appreciated that the other proximity signals than RFID may additionally or alternatively be used.

For example, the proximity signal which is detected by the proximity detector 113 may be a signal of a short range communication system such as Bluetooth™ transmission. Specifically, the access point 101 may comprise a Bluetooth receiver which continuously monitors for Bluetooth advertisements signals. If an advertisement signal such as a "BT_name advert" is received from a user equipment 109 registered with the access point 101, this is considered to be a proximity detection and accordingly the access point 101 begins the temporary transmission of the pilot signal on the macro-cell frequency.

As another example, the proximity signal may be a signal of a Wireless Local Area (WLAN) network, such as for example an IEEE 802.11 communication system. Thus, the access point 101 may comprise a WLAN base station and the user equipment 109 may comprises a WLAN transceiver which can attach to the base station. When the access point detects this attachment, it proceeds to determine if the user equipment 109 is registered with the access point 101 and if so it proceeds to transmit the pilot signal.

In some embodiments, the pilot signal is only transmitted if an uplink interference measure for the access point meets an interference criterion. Specifically, the access point 101 may comprise means for monitoring the uplink interference/noise level at the access point and only if this measure is below a predetermined threshold will the pilot signal be transmitted.

Such an approach may prevent that the access point 101 transmits the pilot signal in the presence of a user equipment which is not registered with the access point 101 (and thus cannot use it) but is located very close to it. For example, if a first user equipment served by the macro base station 103 is located within the region served by the access point 101 (or closely outside), the transmission of a pilot signal on the macro layer frequency may cause so much interference that the quality of service for the user equipment is severely degraded. Therefore, if a user equipment registered with the access point is detected by the proximity detector 113, the interference level is measured and as the first user equipment is transmitting to the macro base station 103 this is likely to be high. Accordingly, the pilot signal is not transmitted thereby ensuring that the ongoing communication from the first user equipment is still supported. Although, such an approach may delay or prevent a registered user equipment being lead-in to the access point 101 it will typically be acceptable as the user equipment may still be supported by the macro base station until the first user equipment leaves the area or terminates its active communication.

In some embodiments, proximity detection is continually performed for both user equipments that are registered with the access point as well as those that are not, i.e. it also monitors for user equipments which are not eligible to use the underlay frequency of the access point. The lead-in (macro) frequency pilot signal is only transmitted by the access point if the proximity detector 113 has not detected the presence of an unregistered user equipment.

In some embodiments, the lead-in macro frequency pilot signal is always transmitted when the proximity detector 113 detects the presence of a registered user equipment, regardless of the presence of unregistered equipments. In these embodiments, the access point 101 will sometimes receive handover or reselection requests for these equipments. The access point 101 may reject these, and normal operation should continue provided the macro frequency pilot signal is switched off promptly once the registered user equipment has been handed over or reselected to the underlay frequency. If the period of operation of the lead-in frequency is short, normal communication may not be affected appreciably.

In some embodiments, the reselection or handover requests to the macro frequency may be accepted, and the unregistered user equipments may be temporarily supported by the access point 101. In these embodiments, the access point 101 may wait until the registered user equipment has been moved to the underlay frequency, and then initiate procedures for handover or reselection back to the macrocell for the unregistered user equipments.

Alternatively or additionally, the amplitude of the lead-in frequency pilot signal may be reduced gradually thereby automatically triggering normal procedures for handover or reselection. Therefore, the unregistered user equipments are temporarily supported by the access point 101 on the macro frequency which is maintained until all its traffic is cleared. In this approach, the time taken to redirect the registered user equipment to the underlay frequency is less critical since other equipments are allowed to temporarily handover or reselect, and are not affected by the interference caused by the lead-in frequency.

The time period following the switch of the registered user equipment to the underlay frequency during which the macro frequency pilot signal is reduced may have a duration which depends on the preferences of the individual embodiment. However, the period of time is typically selected to be sufficient for switching of a user equipment from the first frequency of the underlay cell to the first frequency of the first cell. Thus, the duration and/or the rate of reduction is selected such that the unregistered user equipments handover or reselect before the pilot signal power has reduced to a level where the user equipment cannot be supported.

Figure 2:
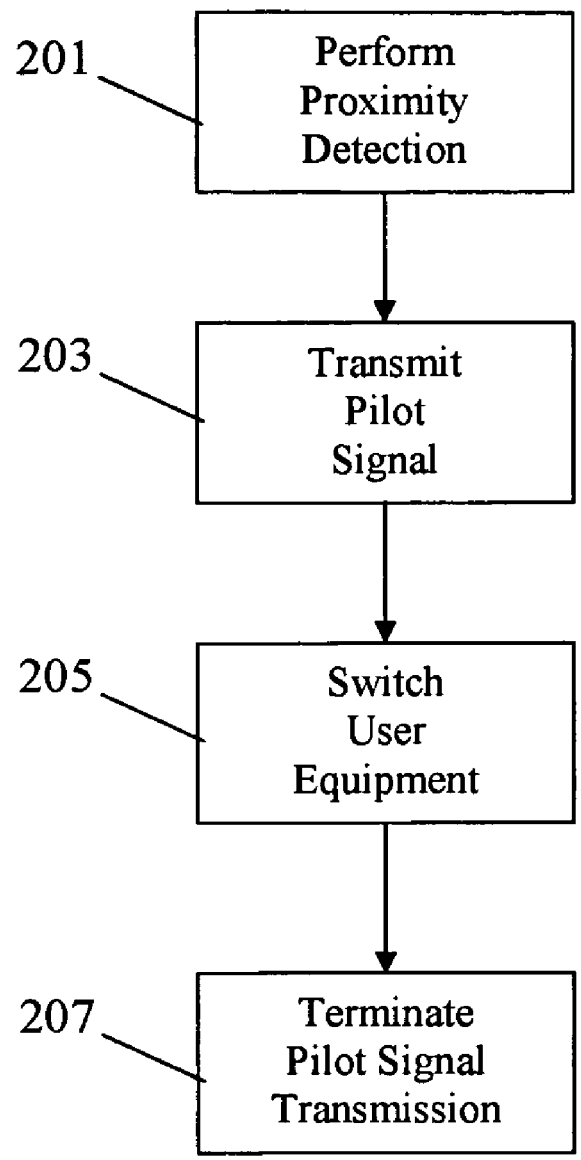
FIG. 2 illustrates an example of a method of operation for a cellular communication system in accordance with some embodiments of the invention.

FIG. 2 illustrates an example of a method of operation for a cellular communication system comprising a first access point for supporting an underlay cell of a first cell. The first cell is supported by a first frequency and the underlay cell is supported by the access point on a second frequency.

The method initiates in step 201 wherein a proximity detection is performed for a user equipment in response to a wireless transmission from the user equipment. The wireless transmission is not a wireless transmission of the cellular communication system.

Step 201 is followed by step 203 wherein a pilot signal is temporarily transmitted from the access point on the first frequency in response to the proximity detection.

Step 203 is followed by step 205 wherein the user equipment is switched from the first frequency to the second frequency in response to receiving a detection indication from the user equipment. The detection indication is an indication that the pilot signal has been detected by the user equipment.

Step 205 is followed by step 207 wherein the transmission of the pilot signal on the first frequency is terminated following the switch to the second frequency.

It will be appreciated that the description has focussed on an implementation in a CDMA cellular communication system but that the described principles may be used with other systems. In particular, the approach may be applied in an Orthogonal Frequency Multiple Access (OFDM) system. For example, the system may allow a lead-in on one (set of) subcarrier(s) followed by an immediate transition to a different (set of) subcarrier(s). As another example, a lead-in may be performed in one OFDM frequency band followed by a transition to a different OFDM frequency band.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention is claimed is:

1. An access point for a cellular communication system, the access point supporting an underlay cell of a first cell, the first cell being supported by a first frequency and the underlay cell being supported by the access point on a second frequency, the access point comprising:
   proximity detection means for performing a proximity detection for a user equipment in response to a wireless transmission from the user equipment, the wireless transmission not being a wireless transmission of the cellular communication system;
   transmitting means for temporarily transmitting a pilot signal from the access point on the first frequency in response to the proximity detection;
   switching means for switching the user equipment from the first frequency of the first cell to the second frequency of the underlay cell in response to receiving a detection indication from the user equipment, the detection indication being an indication that the pilot signal has been detected by the user equipment; and
   means for terminating the transmission of the pilot signal on the first frequency following the switching of the user equipment to the second frequency.

2. The access point of claim 1 wherein the switching means is arranged to handover an active call of the user equipment by performing a same frequency handover of the active call on the first frequency from the first cell to the underlay cell, and then handing over the active call from the first frequency of the underlay cell to the second frequency of the underlay cell.

3. The access point of claim 2 wherein the access point is arranged to only support a signalling part of the active call on the first frequency.

4. The access point of claim 1 wherein the user equipment is an idle mode user equipment and the switching means is arranged to transmit a cell reselection command to the user equipment, the cell reselection command instructing the user equipment to attach to the underlay cell.

5. The access point of claim 1 wherein the access point is associated with a set of registered user equipments and the proximity detection means is arranged to determine an identity indication in response to the wireless transmission and the transmission means is arranged to transmit the pilot signal only if the identity indication corresponds to a user equipment of the set of registered user equipments.

6. The access point of claim 1 wherein the access point comprises a Radio Frequency IDentification, RFID, receiver and the wireless transmission is an RFID transmission from an RFID tag of the user equipment, and wherein the RFID receiver is located at an entry/exit of a region served by the underlay cell and the proximity detection means is furthermore arranged to determine an entry/exit proximity detection in response to a detection of the RFID transmission and a determination that the user equipment is currently supported by the access point.

7. The access point of claim 1 wherein the transmitting means is arranged to transmit the pilot signal only if an uplink interference measure for the access point meets an interference criterion.

8. The access point of claim 1 wherein the access point is arranged to temporarily support on the first frequency an unregistered user equipment during a switching of the user equipment from the first frequency of the first cell to the second frequency of the underlay cell, the unregistered user equipment being a user equipment not authorised to use the second frequency of the underlay cell.

9. The access point of claim 1 wherein the access point comprises means for reducing an amplitude of the pilot signal over a period of time following the switching of the user equipment from the first frequency of the first cell to the second frequency of the underlay cell, the period of time being sufficient for switching of a user equipment from the first frequency of the underlay cell to the first frequency of the first cell.

10. A method of operation for a cellular communication system comprising a first access point for supporting an underlay cell of a first cell, the first cell being supported by a first frequency and the underlay cell being supported by the access point on a second frequency, the method comprising:
  performing a proximity detection for a user equipment in response to a wireless transmission from the user equipment, the wireless transmission not being a wireless transmission of the cellular communication system;
  temporarily transmitting a pilot signal from the access point on the first frequency in response to the proximity detection;
  switching the user equipment from the first frequency to the second frequency in response to receiving a detection indication from the user equipment, the detection indication being an indication that the pilot signal has been detected by the user equipment; and
  terminating the transmission of the pilot signal on the first frequency following the switching of the user equipment to the second frequency.

* * * * *